K. H. FULTON.
PROCESS OF PRODUCING CELLULAR MATERIAL.
APPLICATION FILED MAY 6, 1920.
1,385,044. Patented July 19, 1921.
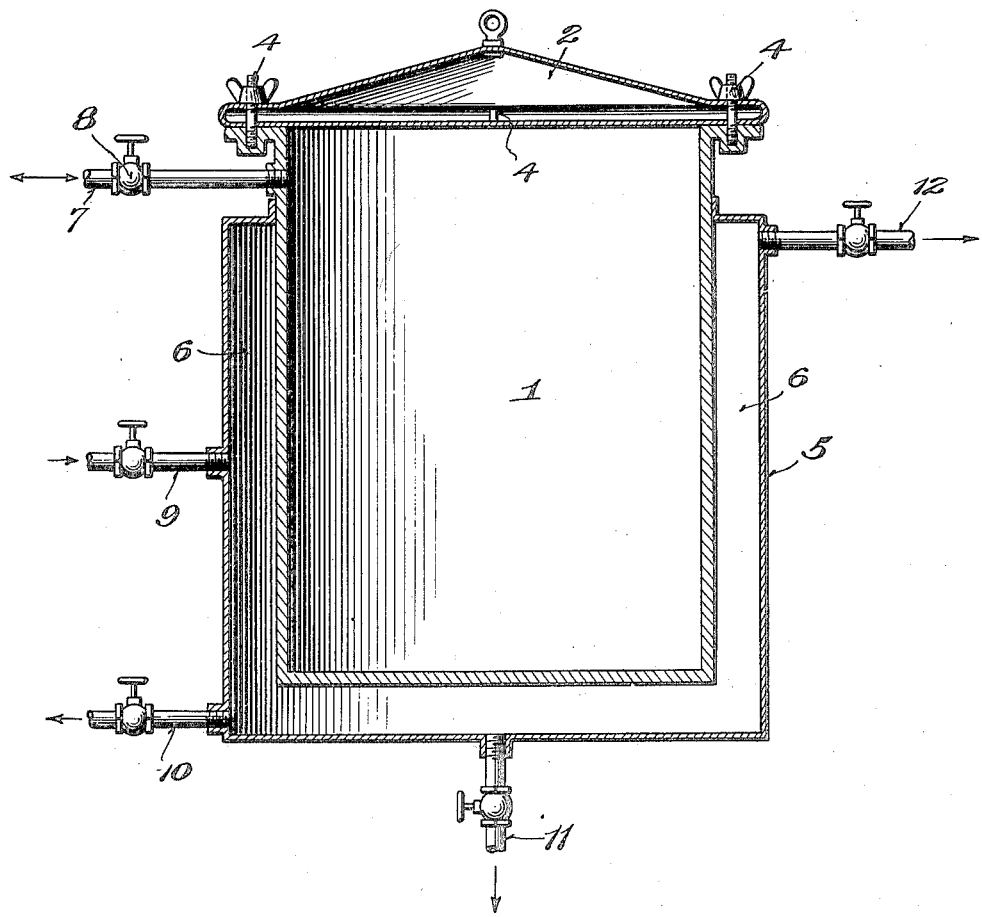
Inventor
Karl H. Fulton,
By Bacon+Thomas
Attorneys

UNITED STATES PATENT OFFICE.

KARL H. FULTON, OF PITTSBURGH, PENNSYLVANIA.

PROCESS OF PRODUCING CELLULAR MATERIAL.

1,385,044.   Specification of Letters Patent.   Patented July 19, 1921.

Application filed May 6, 1920. Serial No. 379,308.

REISSUED

*To all whom it may concern:*

Be it known that I, KARL H. FULTON, citizen of the United States of America, residing at 220 Shady avenue, Pittsburgh, in the county of Allegheny and State of Pennsylvania, have invented certain new and useful Improvements in Processes of Producing Cellular Material, of which the following is a specification.

The invention relates to a process of producing cellular material.

It is an object of the invention to provide a process for producing cellular rubber, having a multitude of separate gas bearing cells arranged throughout the body thereof.

It is a further object of the invention to provide a process wherein relatively soft cellular rubber articles, or relatively hard cellular rubber may be produced for use in various fields.

The invention is based on the discovery that certain granular substances when incorporated in a body of rubber and subjected to the action of a gas under pressure, possess the characteristics of absorbing or occluding in the voids or interstices of the granules appreciable quantities of the gas without effecting a change in the size or formation of the granules. If the material, while still subjected to the gas under pressure is given a vulcanizing treatment, the rubber will be vulcanized around the infinite number of minute gas bearing granules forming coatings or envelops for the granules. The gas occluded in the granules does not escape during the vulcanizing treatment which is carried on in the presence of the gas under pressure, and after the vulcanization the material is cooled while still under gas pressure to prevent the liberation of the occluded gas. To form the cellular material the vulcanized product is then again heated when the gas pressure has been released, the occluded gas of each granule then escaping or being released expanding the elastic material forming a coating therefor, thereby producing in the body an infinite number of separate gas cells. The formation of each cell is produced by the releasing of the occluded gas of the granular particle, which assumes a volume several times of that of the original particle thereby expanding the cell an appreciable extent which may be controlled by the pressure of the gas when the particles are first subjected to the action thereof.

The final volume of the cellular rubber depends upon the number of cells formed therein, and also upon the amount of gas in each cell. It will be apparent that the granular material is intimately mixed with the rubber, and the number of cells is equal to the number of particles of the granular material employed in the original mixture.

In carrying out the present process I preferably intimately mix raw Pará rubber, with a sufficient quantity of sulfur to bring about vulcanization, and the finely divided granular material which is preferably a material such as activated charcoal. This material is commercially manufactured by the dry distillation of dense vegetable material, such as cocoanut shells, peach kernels, and the like, and I have discovered that it possesses the characteristic of absorbing or occluding relatively large quantities of gas when subjected thereto under pressure. The material is preferably comminuted or pulverized to a very fine mesh, as for example a hundred mesh, and when thoroughly mixed with the raw rubber is shaped into a desired form depending upon the use of the cellular rubber and subjected to the action of an inert gas under pressure. Various forms of gas may be used, but I have found that an inert gas such as nitrogen is highly efficient in performing the process.

When the mixture is thus shaped the material is introduced to a receptacle which is sealed or formed in any convenient manner to prevent the escape of gas therefrom, and the inert gas such as nitrogen is then introduced to the receptacle. The gas is readily occluded by the charcoal and finds lodgment in each of the minute voids or interstices therein throughout the infinite number of granules, but the occluded gas does not effect a change in shape or size of the mass in any way. The gas thus comes in direct contact with the rubber mass, and enters the activated charcoal as described above. After being subjected to the action of the gas for the desired period, the rubber is then vulcanized by subjecting the same to the necessary heat treatment, attention being called to the fact that during the vulcanization of the rubber the pressure of the inert gas is maintained, and also after vulcanization the vulcanized mass is cooled in the presence of the nitrogen gas still maintained in the container at its original pressure to prevent the charcoal from giving up this occluded gas when the pressure is later released. It will be observed that by maintaining the gas pressure during the vulcanization of the rubber, and also after vulcanization, and while the mass is being subjected to a cooling action the envelops or skins of rubber surrounding each particle are permitted to harden or congeal to prevent the escape or release of the occluded gas of each particle before the gas pressure maintained in the container is released.

When the mass has been cooled after its vulcanization the gas pressure is then released, and to the vulcanized rubber enough heat is then applied to cause the particles of charcoal to give up all the occluded gas. This occurs in view of the fact that during the second heating there is no gas pressure to prohibit the occluded gas from escaping from the charcoal, each particle of which becomes the nucleus of a small gas cell. The heating of the vulcanized rubber when the pressure has been released, causes the occluded gas to be driven or released from the particles of charcoal, the volume or size of each particle of charcoal being exceedingly small as compared with the volume of occluded gas. The discharged gas swells this confining envelop or cell which assumes a size several times that of the original cell. It will be understood that by the provision of the infinite number of particles of charcoal, a corresponding number of cells is formed in the rubber, and that each cell is individually sealed. The resulting mass of cellular rubber is of the same configuration as the original material prior to its heating and vulcanization, but greatly increased in size in all dimensions because of the formation of the multitude of gas cells.

It has been found that the size the original rubber mass is to assume when in a cellular form depends of course in part upon the number of cells formed by the granular particles of charcoal, and the amount of gas confined in each cell. The number of cells, is, as before stated, equal to the number of charcoal particles used in the mixture, while the size of each cell depends upon the pressure of the gas when the material is first subjected to its action. The greater the pressure, manifestly more gas is occluded in the particles thereby forming a larger cell when the occluded gas is released by the final heat treatment.

While the cellular material may be formed from the composition of substances above described when used in various quantities, I have found that a highly efficient cellular rubber can be produced by the employment of activated charcoal to the extent of approximately three to five per cent. of the total of the other ingredients, that is the raw rubber and its vulcanizing agent which may be sulfur, etc. The quantity of sulfur may range from five to fifteen per cent. for the production of good results, and instead of sulfur antimony sulfid, sulfur or mixtures of sulfur and antimony sulfid, and many other vulcanizing agents or accelerators may be employed.

In carrying out the present process no particular form of apparatus need essentially be employed, but for the sake of clearness I have disclosed in the accompanying drawing a type of apparatus which may be successfully employed to support the process. This apparatus is simply shown for the purpose of illustration, and not for limitation, and I wish it to be distinctly understood that the process is one that is susceptible of being carried into use by many forms of apparatus widely different from that disclosed in the present drawing forming a part of this application.

In the drawing Figure 1 represents a section view through the apparatus.

Referring now more particularly to the drawing wherein like reference characters indicate corresponding parts the numeral 1 designates a gas tight cylinder or container which may be of any convenient shape and size. This container is provided with a removable closure 2.

The top 2 is united to the body of the container by means of the fastening devices 4 to form a sealed connection between the container and its closure, a suitable packing or the like being employed if desirable. The container 1 is also formed by the provision of a spaced wall 5 with a jacket 6 for receiving the heating and cooling agent.

Leading to the container 1 is a gas feeding pipe 7 controlled by the valve 8, the pipe leading from a suitable gas supply and adapted to convey gas to and from the container under a regulated and variable pressure. The material to be treated consists of the mixed rubber, vulcanizing agent and the multitude of granular particles of activated charcoal which has been kneaded or shaped to the desired configuration.

The shaped material is then placed in the container 1 and subjected to the action of the inert gas entering the container under pressure through the feed pipe 7. This gas is occluded or absorbed in the multitude of charcoal particles in the material, entering the voids or interstices thereof, the quantity of gas being absorbed depending upon the pressure of the gas entering the container. The material is then subjected to a vulcanizing temperature by the introduction of a heating medium, which may be steam, water and the like conveyed to the jacket 6 by the feed pipe 9 and drained out through the pipe 11. The desired vulcanizing temperature is then maintained for the proper period during which time the material is still being subjected to the action of the inert gas under pressure. After the rubber has been vulcanized the gas is still maintained under pressure in the container 1 and a cooling medium introduced to the jacket through the pipe 10, and out through pipe 12. This cooling medium serves to prevent the escape of the gas from the particles of charcoal when the pressure is later released, forming tenaceous envelops surrounding each particle of charcoal which is later to constitute a gas cell.

When the cooling has progressed to the desired degree, the cooling medium is discharged from the jacket 6 and the gas pressure in the container 1 released until the material is subjected to an atmospheric pressure. The mass is then again heated by the introduction of a heating agent through the feed pipe 9, to a temperature approximately 200 degrees Fahrenheit for a period of several hours, which causes the particles of charcoal, each individually encircled or inclosed by an envelop or film of the rubber to release its occluded gas, and as the size of each particle of charcoal is so small as compared with the volume of occluded gas absorbed thereby, the envelop surrounding the occluded particle is caused to swell by the suspending gas several times that of its original size. It will be observed that this last heating step is performed while the material is no longer under the action of the nitrogen gas under pressure, and here it might be mentioned that the size of each gas cell is primarily dependent upon the pressure of the gas to which the material is originally subjected.

In following the present process products adapted for many different uses may be made, this generally depending upon the kind of rubber used. If it is desirable to produce a hard vulcanized cellular rubber which does not possess much resiliency, all Pará rubber is used in the mixture with an excess of sulfur to carry the vulcanization to a completion. The gas is of course occluded in the particles during this vulcanization, and subsequently released, forming a hard cellular rubber mass of high tensile strength which may be fashioned in the form of boards and the like, applicable for use as a hard insulating material for linings for refrigerators, refrigerator cars and the like. In producing the hard vulcanized cellular rubber of this character, the vulcanization is not carried to completion when the article is first subjected to heat, but merely to a stage to produce a soft cellular rubber. After this preliminary heating or vulcanization the material is again subjected to the action of a vulcanizing temperature until complete vulcanization has taken place. To obtain boards or the like having relatively smooth surfaces, the final vulcanizing step is preferably accomplished in a press providing smooth surfaces.

To provide a soft cellular article, or cellular rubber which is very spongy, a mixture of Pará and balata rubbers is used, mixed with the proper quantities of sulfur or like vulcanizing agent and the granules of charcoal. This material is then subjected to the treatments described in defining the main process and the articles produced are particularly useful as heat insulating, and water proofing materials, upholstery, mattresses, and the like.

The present process also contemplates the production of tire fillers or like articles which naturally must possess a great amount of resiliency. In manufacturing tire fillers having a thickness of several inches or more it has been found necessary that during the shaping of the original mixture of Pará and balata rubbers and the other ingredients to insert numerous continuous fibrous filaments in the original rubber mixture. These filaments run from end to end of the mixture and serve to provide passageways for the inert gas to permeate the multitude of the charcoal particles distributed throughout the body of the mixture. This is of course required in order that the gas may come in contact with and be absorbed or occluded in the activated charcoal particles which lie in the body of the filler. The mass is then vulcanized while under the influence of the gas pressure and cooled before the gas pressure is released. Before the final heating to release the gas occluded in the charcoal particles the filler is preferably placed within a tire shoe mounted upon a rim and the entire assembly subjected to the second heating action. This causes the occluded gas to be driven from the charcoal particles and a consequent expansion of the filler so as to completely fill the interior of the tire shoe, because the pressure of the nitrogen gas has been released.

In the foregoing specification I have only described a few of the uses of the material produced by this process, but it will of course be understood that the process is susceptible of producing materials which are useful and applicable in unlimited fields.

Having thus described the invention what I claim is:

1. The process of producing cellular rubber, comprising mixing rubber with gas occluded particles, in subjecting the mixture to the presence of gas under pressure to be absorbed by said gas occluded particles, in vulcanizing the material while being subjected to the gas pressure, in allowing the material to then cool, and in finally heating the material to cause the occluded gas to be discharged from the particles forming in the material a multitude of gas cells.

2. The process of producing cellular rubber, comprising the intermixing of raw rubber with divided granular material susceptible of occluding gas, in subjecting the mixture to the action of a gas under pressure whereby the granular particles occlude appreciable quantities of the gas, in vulcanizing the material while still being subjected to the action of the gas under pressure, and in finally permitting the occluded gas of the granular particles to be discharged to form in the rubber body a multitude of gas bearing cells by subjecting the same to the heat treatment in the absence of the gas pressure.

3. The process of manufacturing cellular rubber, comprising the mixing of raw rubber and finely divided activated particles, in subjecting the material to the action of an inert gas under pressure to be absorbed by the activated particles, in vulcanizing the material to form envelops surrounding the granular particles having occluded gas, and in then heating the material after the gas pressure has been released to cause the occluded gas to be discharged from the particles for expanding the formed envelops, and producing in the mass a multitude of separated gas cells.

4. The process of manufacturing cellular rubber, consisting in introducing to raw rubber a finely divided granular material susceptible of absorbing gas, in subjecting the mixture to the action of a gas under pressure, whereby the granular material absorbs appreciable quantities thereof, in vulcanizing the material in the presence of the gas under pressure, in cooling the material, and in then heating the material after a releasing of the gas pressure to cause the granular particles to give up their absorbed gas and produce in the rubber a multitude of separated gas cells.

5. The process of producing cellular rubber, comprising the intermixing of raw rubber with comminuted particles of activated material, in absorbing in the particles a gas, in vulcanizing the material to form coatings surrounding the comminuted gas bearing particles, and in then heating the material to cause the gas contained in the particles to be discharged therefrom producing in the rubber a multitude of separated gas bearing cells.

6. The process of manufacturing cellular rubber, comprising the intermixing of finely divided granular material with raw rubber, in subjecting the intermixed material to the action of an inert gas under a variable regulatable pressure to cause the granular particles to absorb a quantity of the gas, in then subjecting the material to a vulcanizing temperature in the presence of the inert gas under pressure, in cooling the material after vulcanization while subjected to the inert gas under pressure, and in finally again heating the material when the pressure of the inert gas no longer exists to cause the occluded gas of the granular particles to be discharged forming in the rubber a multitude of gas bearing cells.

7. The process of manufacturing cellular rubber, which consists in mixing rubber with a granular activated material, in subjecting the mixture to the action of a gas under pressure to cause the granular material to absorb gas, in vulcanizing the mixed substances while under pressure, in cooling the material after vulcanization, in releasing the gas pressure after cooling, and in then heating the material to cause the occluded gas to be discharged from the granular particles forming a multitude of rubber cells.

8. The process of producing cellular rubber which consists in mixing with rubber forming material gas occluding particles, in vulcanizing the mixture and in allowing the same to then cool, and in finally heating the material when in a cool state to cause the occluded gas of the particles in the material to be released forming therein a multitude of noncommunicating gas cells.

9. The process of producing cellular rubber which consists in mixing the rubber and gas occluding particles, in subjecting the mixture to the presence of gas, in vulcanizing the mixture, in allowing the vulcanized product to cool, and in finally heating the material to cause the particles to give up their occluded gas forming in the material a multitude of noncommunicating cells.

In testimony whereof I affix my signature.

KARL H. FULTON.